United States Patent [19]

Horikawa et al.

[11] 4,097,258

[45] Jun. 27, 1978

[54] OPTICAL FIBER

[75] Inventors: Susumu Horikawa, Fussa; Kenji Nakagawa, Tokorozawa; Yoshito Nogami, Saitama, all of Japan

[73] Assignee: Hoya Glass Works, Ltd., Tokyo, Japan

[21] Appl. No.: 696,657

[22] Filed: Jun. 16, 1976

Related U.S. Application Data

[63] Continuation of Ser. No. 578,785, May 19, 1975, abandoned.

[30] Foreign Application Priority Data

May 17, 1974 Japan ................... 49-55207

[51] Int. Cl.² ................. C03C 13/00; C03C 15/00
[52] U.S. Cl. .......................... 65/31; 106/50; 106/52; 350/96.32
[58] Field of Search ............... 106/50; 65/31

[56] References Cited

U.S. PATENT DOCUMENTS

| | | | |
|---|---|---|---|
| 3,758,284 | 9/1973 | Haller | 65/31 |
| 3,843,228 | 10/1974 | Yoshiyagawa et al. | 350/96 M |
| 3,884,550 | 5/1975 | Maurer et al. | 350/96 M |
| 3,938,974 | 2/1976 | Macedo et al. | 106/50 X |
| 4,046,948 | 9/1977 | Zlochower | 106/50 X |
| 4,063,001 | 12/1977 | Zlochower | 106/50 X |

*Primary Examiner*—Helen M. McCarthy
*Attorney, Agent, or Firm*—Sughrue, Rothwell, Mion, Zinn and Macpeak

[57] ABSTRACT

An optical fiber comprising a core glass and a cladding glass therearound, wherein at least the core glass contains $GeO_2$ as an additive to increase the refractive index with respect to the cladding glass. The fiber glass is prepared by heat treating a starting glass to separate out a $B_2O_3$—$Na_2O$-rich phase for subsequent acid leaching, and by sintering a residual glass with low concentrations of light absorbing impurities. Ingredients of the starting glass in weight percent are as follows:

$SiO_2$: 25 — 80
$B_2O_3$: 10 — 30
$Na_2O$: 3 — 12
$GeO_2$: 3 — 40
$Al_2O_3$: 0 — 4

4 Claims, No Drawings

OPTICAL FIBER

This is a continuation of application Ser. No. 578,785, filed May 19, 1975, now abandoned.

BACKGROUND OF THE INVENTION

1. Field of the Invention

This invention relates to an optical fiber suitable for an optical waveguide.

2. Description of the Prior Art

An optical glass fiber for an optical waveguide is usually designed to form a clad-core combination where the core glass has a higher refractive index than that of the clad glass. Suitable materials for the core and the cladding can be selected from a wide range of glasses, if they meet the stringent requirement of an extremely low optical loss for the application.

It is known that a silica glass exhibits a low optical loss due to its inherently low scattering of light. And a silica glass is regarded as one of most promising glasses either for the core or the clad. For a silica glass, chosen as a core, a clad glass must have a refractive index lower than the silica glass. Since most glasses have higher refractive indices than that of a silica glass, selection of a glass for the clad, is severely limited. A $B_2O_3$—$SiO_2$ glass alone can be a candidate for the application, but its index can not be altered by more than 0.3%.

When a silica glass is used as the clad, a large number of glasses are available as core materials, with addition of various types of oxides to a silica glass. Practical difficulties in this combination emerge in attaining low concentrations of light absorbing substances or in gaining control of complex gaseous reactions when gaseous reactants are used as raw materials. Use of raw materials of extremely high purity is therefore unavoidable.

This invention, using raw materials of ordinary commercial purity can produce core and clad glasses with low concentrations of impurities.

SUMMARY OF THE INVENTION

This invention provides an optical fiber glass with low concentrations of light absorbing substances such as Mn, Fe, Co, Ni, Cu and Cr, using raw materials with a purity ordinarily used for commercial optical glasses. The composition of starting glass, is in weight percent, 25 to 80% $SiO_2$, 10 to 30% $B_2O_3$, 3 to 12% $Na_2O$, 3 to 40% $GeO_2$ and 0 to 4% $Al_2O_3$, where the sum of $SiO_2$ and $GeO_2$ is more than 55% and the mole ratio of $Na_2O$ to $B_2O_3$ lies between 0.20 to 0.47. The glass is heat treated at temperatures around 500° to 700° C to cause the glass to separate into two phases; an $Na_2O$—$B_2O_3$—rich phase and an $SiO_2$—$GeO_2$—rich phase. The $Na_2O$—$B_2O_3$—rich phase can be removed by acid leaching which yields a porous glass mainly composed of $SiO_2$, $GeO_2$ (and $B_2O_3$). The porous glass is then sintered at a temperature around 900° to 1200° C to form a dense and transparent glass. The refractive index of the resulting glass for the core and clad can be tailored by adjusting the $GeO_2$ content in the glass through selection of the starting glass compositions. As the $GeO_2$ content increases in the starting glass, acids for leaching should be carefully selected for leaching efficiency. Organic acids such as oxalic acid are more effective than inorganic acids.

DETAILED DESCRIPTION OF THE INVENTION

The requirements of glasses for an optical waveguide application are that the concentration of light absorbing substances, particularly of Mn, Fe, Co, Ni, Cu and Cr, be as low as a few ppb and that the core glass have a refractive index higher than the clad glass by 0.3 to 1.0%. For attaining low concentrations of the substances in the glass, raw materials of extremely high purity are mandatory and hence this requirement presents practical problems of limited supply of the raw materials and a high cost of the final product.

The optical fiber glasses produced in this invention only require raw materials of the purity used for commercial optical glasses. The concentration of impurities, after acid treatment, can be easily reduced to a level acceptable for optical waveguide application. A starting glass prepared from the raw materials is heat treated to cause phase-separation which renders one of the phases removable by acid leaching. The acids used are of a reagent grade and the water used for the acid solution and for the washing fluid is distilled water. The reduction of the impurity level achieved in the remaining glass after the acid leachings is conceivably due to the chemical behavior of the leached phase which collects the impurities in the starting glass.

The starting glass, since it is multicomponent, can be readily formed with little cords and bubbles, without intensive care to maintain the purity of the melt unlike multicomponent optical fiber glasses.

preferable composition of the starting glass in the invention lies in the range, by weight, of $SiO_2$: 25 — 80%
$B_2O_3$: 10 — 30%
$Na_2O$ : 3 — 12%
$GeO_2$: 3 — 40%
$Al_2O_3$: 0 — 4% and such that the sum of $SiO_2$ and $GeO_2$ is not less than 55% and the mole ratio of $Na_2O$ to $B_2O_3$ lies in the range of 0.20 to 0.47. The composition range above is restricted so as to warrant the following criteria;

(1) Presence of a spatially interconnected structure as a result of so called "spinodal decomposition" in a heat treated glass.

(2) Absence of a large stress causing fracture of the glass during acid leaching.

(3) Freedom from devitrification.

As to $SiO_2$ and $GeO_2$, an $SiO_2$ content less than 25%, or a $GeO_2$ content greater than 40% or a sum of the $SiO_2$ and $GeO_2$ content being less than 55% should be ruled out because of an exceedingly slow leaching caused by absence of the spinodal phases. At an $SiO_2$ content greater than 80%, the melt temperatures are practically too high to prepare a homogeneous glass and the immiscible temperature is too low to develop an adequate amount of the separated phases.

At an $Na_2O$ content less than 3%, glass formation is somewhat unstable and the glass during leaching develops a large stress enough to cause fracture of the glass. The addition of $Na_2O$ in more than 12% tends to inhibit the spinodal decomposition and induces tensile stress on the leached portion to cause fracture during acid leaching.

At a $B_2O_3$ content less than 10%, the glass exhibits the tendency to inhibit spinodal decomposition, while a $B_2O_3$ content of more than 30% enhances the decomposition to such a rate that decomposition can not be controlled well i.e., the fresh melted glass rapidly develops phase separation during cooling.

As to the mole ratio of $Na_2O$ to $B_2O_3$, the mole ratio should lie between 0.20 to 0.47. At a ratio less than 0.20, control of the phase separation becomes difficult and acid leaching induces a large stress to cause fracture, while a ratio greater than 0.47 tends to inhibit phase separation and consequently leads to an extremely slow rate of leaching accompanied by destructive tensile stresses on the leached layer.

An increase in the refractive index of the resulting glass is the intended object of the $GeO_2$ addition. The $GeO_2$ content should not be more than 40% A content above 40% tends to inhibit spinodal decomposition and the resulting refractive index ceases to increase.

$Al_2O_3$ as an additive plays a minor role of inhibiting devitrification of the glass during sintering and may be eliminated. The $Al_2O_3$ content should not exceed more than 4% since it suppresses the spinodal decomposition.

The following examples are intended to illustrate the present invention in greater detail but are not to be considered as limiting the same. Unless otherwise indicated, percents are given by weight.

EXAMPLE

An admixture of silica, boric oxide, sodium carbonate, sodium nitrate and germanium oxide in proper portions was prepared to yield a glass of a composition, $SiO_2$ 61%, $B_2O_3$ 21%, $Na_2O$ 8%, $GeO_2$ 9%, and $As_2O_3$ 0.5%. $As_2O_3$ was added as a refining agent. The raw materials were those used ordinaily for commercial optical glasses. The mixture was melted in a silica crucible in an electric furnace at 1400° C for 2 hours. The melt was transferred to a platinum crucible in the furnace and agitated both for improvement of homogeneity and for removal of bubbles. After the melt was held at temperatures of 1200°–1400° C for 6 hours, it was cast in an iron frame. A portion of the glass devoid of bubbles and cords, inspected under an He—Ne laser, was heat treated at 580° C for 200 hours. The glass was then soaked in a 2N $H_2SO_4$ aqueous solution at 100° C for 300 hours, to leach out the $Na_2O$—$B_2O_3$—rich phase. For the solution, distilled water and $H_2SO_4$ of a high purity grade were used. Subsequently, the glass was washed in distilled water, then dried and sintered in a vacuum at 1100° C for 1 hour. The refractive index ($n_d$) of the sintered glass was found to be 1.4664 and the concentrations of each substance Mn, Fe, Co, Ni, Cu and Cr were lower than the detectable level (50 ppb) by the analytical method used, compared to 27 ppm of Fe contained in the starting glass.

The sintered glass was ground into a cylindrical rod of a diameter of 4.5 mm and then it was polished, washed and finally fire-polished. The rod was inserted in a silica glass tubing with a 5 mm inner diameter and a 7 mm outer diameter, to form a rod-in-tube assembly. The assembly was heated to 1830° C in a Tammann furnace and pulled downward to form a thin fiber of a core diameter of 100μm and of an outer diameter of 140μm.

The combination of the two glasses as an optical fiber provides a difference of 0.52% in refractive indices between the core and clad, the silica glass having a refractive index of 1.4588. The difference in the refractive indices can be tailored by adjusting the $GeO_2$ content in the starting glasses.

As the $GeO_2$ content in the starting glass increases to 20 to 30%, inorganic acids such as $H_2SO_4$, $HNO_3$ and HCl become less effective for leaching, leaving undissolved Ge in the interior of the glass and giving rise to an appreciable concentration gradient along the thickness direction. Organic acids, containing in part by multiple hydroxyl groups and/or multiple COOH groups, become more effective leaching agents in comparison with inorganic acids. The effectiveness of several organic acids, compared with inorganic acids, is given in Table 1. As a measure of the effectiveness, the ratio of the $GeO_2$ concentration measured at the center of a block, 10 mm thick × 10 mm wide × 50 mm long, to the concentration measured at the surface of the block after leaching for 200 hours in a 2N aqueous solution, followed by sintering in vacuum for 1 hour at 1050° C, is shown:

Table 1
LEACHING ACID COMPARISON

| ACIDS | RATIO OF $GeO_2$ CONCENTRATIONS |
|---|---|
| Oxalic Acid $(COOH)_2$ | 1.18 |
| Succinic Acid $(CH_2COOH)_2$ | 1.25 |
| Malonic Acid $CH_2(COOH)_2$ | 1.22 |
| Tartaric Acid $(HCOHCOOH)_2$ | 1.20 |
| Glycolic Acid $(HOCH_2COOH)$ | 1.16 |
| Sulfuric Acid $(H_2SO_4)$ | 2.03 |
| Nitric Acid $(HNO_3)$ | 1.91 |
| Hydrochloric Acid (HCl) | 1.82 |

While this invention has been described in great detail on how an embodiment of an optical fiber can be produced it should be understood that numerous modifications can be made by those skilled in the art without departing from the scope of the invention. Modifications include an optical fiber where both a core glass and a clad glass are prepared by the method described in the invention. Therefore, the appended claims are intended to cover all such equivalent variations as coming within the true spirit and scope of the invention.

What is claimed is:

1. In a method for preparing the core glass of an optical fiber comprising:
   heat treating a starting glass to cause phase separation,
   leaching with an acid to obtain a porous glass with low concentration of Mn, Fe, Co, Ni, Cu and Cr, and
   sintering the porous glass into a dense, transparent glass, wherein said starting glass is composed mainly of $SiO_2$, $Na_2O$, $B_2O_3$ and $GeO_2$ and said heat-treating causes phase separation of an $Na_2O$—$B_2O_3$ rich phase and said leaching with an acid removes said $Na_2O$—$B_2O_3$ rich phase and a porous glass composed mainly of $SiO_2$—$GeO_2$ is obtained; the improvement comprising said acid being a polyhydric and/or polycarboxylic organic acid such that undissolved Ge does not remain in the pores of the porous $SiO_2$ $GeO_2$ glass during said acid leaching.

2. The method of claim 1 wherein the starting glass consists essentially of, in weight percent, 25 to 80% $SiO_2$, 10 to 30% $B_2O_3$, 3 to 12% $Na_2O$, 3 to 40% $GeO_2$ and 0 to 4% $Al_2O_3$, and wherein the sum of $SiO_2$ and $GeO_2$ is not less than 55% and that the mole ratio of $Na_2O$ to $B_2O_3$ is between 0.20 to 0.47.

3. The method of claim 1, wherein said organic acid is selected from the group consisting of oxalic acid, succinic acid, malonic acid, tartaric acid and glycolic acid.

4. The method of claim 3 wherein said acid is oxalic acid.

* * * * *